United States Patent
Liu et al.

(10) Patent No.: US 11,222,083 B2
(45) Date of Patent: Jan. 11, 2022

(54) WEB CRAWLER PLATFORM

(71) Applicant: International Business Machines Corporation, Armonk, NY (US)

(72) Inventors: Chih-Hsiung Liu, Taipei (TW); Peter Wu, New Taipei (TW); Tzu-Chen Chao, Taipei (TW); I-Chien Lin, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 16/533,848

(22) Filed: Aug. 7, 2019

(65) Prior Publication Data
US 2021/0042368 A1    Feb. 11, 2021

(51) Int. Cl.
*G06F 16/95*    (2019.01)
*G06F 16/951*    (2019.01)
(Continued)

(52) U.S. Cl.
CPC ........ *G06F 16/951* (2019.01); *G06F 9/45558* (2013.01); *G06F 16/955* (2019.01); *G06F 2009/45595* (2013.01)

(58) Field of Classification Search
CPC .............................. G06F 16/951; G06F 16/955
See application file for complete search history.

(56) References Cited

U.S. PATENT DOCUMENTS 2,424,966 A * 8/1947 Buchanan ............ H01R 25/006
439/712
6,182,085 B1 * 1/2001 Eichstaedt ............ G06F 9/5083
(Continued)

FOREIGN PATENT DOCUMENTS

CN    106484886 A    3/2017
CN    106874487 A    6/2017

OTHER PUBLICATIONS

Patidar et al., "Improvised Architecture for Distributed Web Crawling", International Journal of Computer Applications (0975-8887), vol. 151—No. 9, Oct. 2016, 7 pages.
(Continued)

*Primary Examiner* — Eliyah S. Harper
(74) *Attorney, Agent, or Firm* — Christopher M. Pignato

(57) ABSTRACT

Systems, methods, and computer program products for implementing a web crawler platform comprising one or more containerized web crawler programs working in tandem to synergistically index web resources and reduce redundancy experienced by multiple web crawlers independently indexing overlapping web resources. The platform provides a URL namespace, allowing crawlers to register with the platform and create URL endpoints for other crawlers to discover existing crawlers registered to the platform and identify web resources previously indexed. The platform provides crawler to crawler communication and exchanges of data and metadata obtained from web resources that have been previously indexed, allowing for crawlers to share existing data or metadata without having to directly crawl through the web resource. As web crawlers move between data centers of different geolocations, the crawler's registered URL is mapped to subsequent IP addresses, allowing for transparency and continuous identification by other crawlers registered with the platform.

20 Claims, 7 Drawing Sheets

(51) Int. Cl.
   *G06F 9/455* (2018.01)
   *G06F 16/955* (2019.01)

(56) References Cited

U.S. PATENT DOCUMENTS

| | | | |
|---|---|---|---|
| 7,117,202 B1* | 10/2006 | Willoughby | G06Q 30/02 |
| 7,139,747 B1 | 11/2006 | Najork | |
| 7,299,219 B2 | 11/2007 | Green | |
| 7,953,868 B2 | 5/2011 | Andreev | |
| 10,778,702 B1* | 9/2020 | Huang | H04L 41/147 |
| 2002/0161745 A1* | 10/2002 | Call | H04L 61/157 |
| 2004/0255048 A1* | 12/2004 | Lev Ran | G06F 16/9574 709/249 |
| 2011/0307467 A1* | 12/2011 | Severance | H04L 67/1095 707/709 |
| 2012/0124478 A1* | 5/2012 | King | G06F 16/90 715/738 |
| 2014/0164352 A1* | 6/2014 | Denninghoff | H03H 9/25 707/711 |
| 2014/0289188 A1* | 9/2014 | Shimanovsky | G06F 16/313 707/609 |
| 2017/0068735 A1 | 3/2017 | Zhang | |
| 2017/0185686 A1* | 6/2017 | Levi | G06F 16/9566 |
| 2017/0195395 A1* | 7/2017 | Weisman | H04L 67/42 |

OTHER PUBLICATIONS

Bal et al., "Smart Distributed Web Crawler", International Conference On Information Communication And Embedded System(ICICES 2016), 978-1-5090-2552-7, 5 pages.

Ye et al., "The Research of a Lightweight Distributed Crawling System", 978-1-5386-5886-4/18/ © 2018 IEEE SERA 2018, Jun. 13-15, 2018, Kunming, China, 5 pages.

Le Quoc et al., "UNICRAWL: A Practical Geographically Distributed Web Crawler", Printed Jun. 27, 2019. 8 pages.

Sharma, Shalini, "Web Crawler", International Journal of Advanced Research in Computer Science and Software Engineering, vol. 4, Issue 4, Apr. 2014, © 2014, IJARCSSE All Rights Reserved, 3 pages.

Ahuja et al., "Web Crawler: Extracting the Web Data", International Journal of Computer Trends and Technology (IJCTT)—vol. 13 No. 3—Jul. 2014, ISSN: 2231-2803, 6 pages.

Huang, June, "Web Crawlers—Crawling Policies", ,Cellopoint, Submitted on Mar. 8, 2011—17:28, © 2009-2017 Cellopoint International Corp. All rights reserved, 2 pages.

Mell et al., "The NIST Definition of Cloud Computing", Recommendations of the National Institute of Standards and Technology, NIST Special Publication 800-145, Sep. 2011, 7 pages.

* cited by examiner

WEB CRAWLER PLATFORM

TECHNICAL FIELD

The present disclosure relates generally to the field of web content indexing and more specifically to a distributed platform of containerized indexing software.

BACKGROUND

Web crawlers are programs that operate to systematically and automatically browse web pages and content on the internet to create or build an index for searching. Web crawlers may also be referred to as spiders, bots, spider bots, or internet bots. Web crawlers identify keywords of the pages, descriptive metadata, the content of each page and the type or nature of hyperlinks provided by the page. Web crawlers may validate the HTML codes of the web page and check or validate the hyperlinks present on the pages being visited. The web crawler indexes the visited pages in a methodical and/or automatic manner and then reports the indexed information back to a search engine or another location responsible for dispatching the web crawler to obtain the desired information. Web crawlers start indexing based a list of uniform resource locators (URL) to visit, which may be referred to as seeds. While web crawlers visit these URLs, the web crawler identifies all the hyperlinks of the page and adds them to the list of URLs to visit. Some web crawlers may not only index websites but may also perform archiving functions by copying and saving the information of the web pages visited to a repository of HTML pages.

SUMMARY

Embodiments of the present disclosure relate to a computer-implemented method, an associated computer system and computer program product for indexing web resources using a web crawler platform, the computer-implemented method comprising the steps of: registering a containerized web crawler to a web crawler platform comprising a plurality of containerized web crawlers; assigning a URL namespace to the containerized web crawler registered to the web crawler platform; receiving a request for the containerized web crawler to index a web resource associated with the URL namespace assigned to the containerized web crawler; querying the web crawler platform for a second URL namespace registered to the web crawler platform that matches the URL namespace assigned to the containerized web crawler; identifying, as a function of querying the web crawler platform, a second containerized web crawler registered to the web crawler platform with the second URL namespace matching the URL namespace assigned to the containerized web crawler and said second containerized web crawler has previously indexed the web resource, storing data or metadata describing the web resource; and fulfilling the request to index the web resource associated with the URL namespace by copying data or metadata stored by the second containerized web crawler to a storage device of the containerized web crawler.

DETAILED DESCRIPTION

Overview

Figure 1:
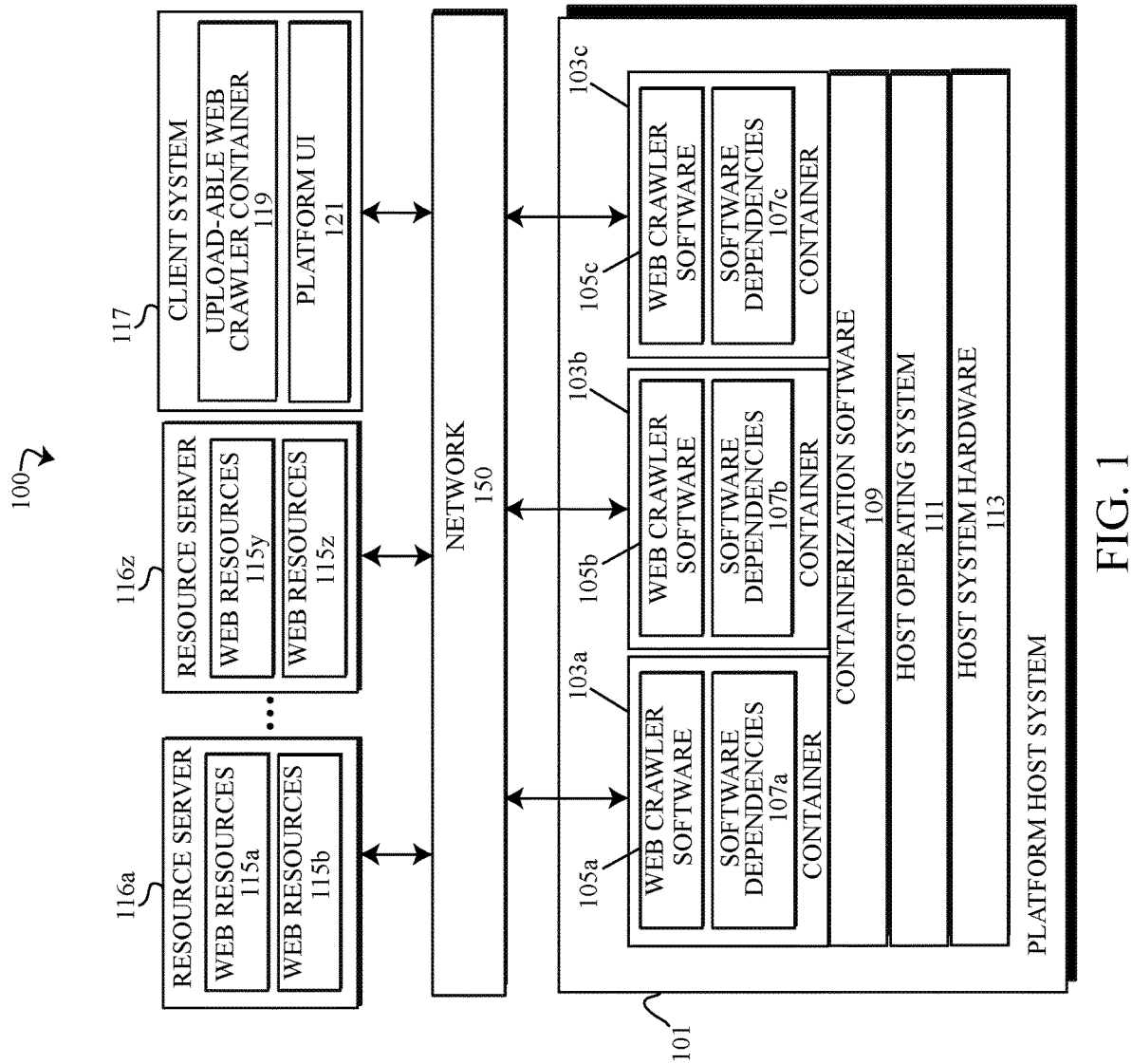
FIG. 1 depicts a functional block diagram describing an embodiment of a computing environment comprising a web crawler platform in accordance with the present disclosure.

There are a tremendous number of web crawlers crawling all over the internet and computer networks throughout the world, simultaneously, at any given time. These web crawlers are constantly being developed, dispatched and automated to run independently by independent creators and developers. Embodiments of the present disclosure recognize that existing web crawlers lack communication and coordination between each other and are often overlapping in the sites and content being indexed by the web crawlers at any moment in time. The sheer number of crawlers that simultaneously crawl across the same web sites can cause heavy amounts of traffic for website owners, slowing down websites and leading to attempts by web site content creators to protect their websites by blocking web crawlers from performing indexing operations.

Embodiments of the present disclosure improve upon the unorganized and disjointed use of web crawlers that currently persist on the internet and other computer networks, by creating a web crawler platform that organizes the actions of web crawlers that are crawling websites to reduce the overlapping of web crawlers downloading and parsing redundant information collected from the web resources of the internet. Instead, the embodiments of the present disclosure synergistically work together to perform crawling operations and share the collected data and/or metadata downloaded and parsed from web resources between the web crawlers instead of web crawlers having to collect the data and/or metadata independently directly from the web resources.

Embodiments of the shared web crawler platform may utilize containerized web crawlers hosted by a platform host system which may be part of a particular data center and/or geolocation from other platform host systems on the web crawler platform. The web crawler platform may provide a URL namespace that may allow for containerized web crawlers to register the web crawler's existence with the web crawler platform, creating a registered URL endpoint that allows existing web crawlers and subsequently created web crawlers to discover previously registered web crawlers registered to the same web resource, based on the URL used in the registration of the web crawler. Newly registered web crawlers registered to the same URL namespace as previously existing web crawlers, can share and reuse existing data and/or metadata downloaded and parsed from web resources instead of directly performing crawling operations on the URL of the web resources. Embodiments of the web crawler platform can identify existing crawlers within the same URL namespace and automatically redirect web crawler requests to the existing web crawler, allowing for web crawler to web crawler communication and sharing of data and/or metadata.

The use of containerized web crawlers as part of the web crawler platform may provide easy portability of web crawlers between the data centers and geolocations maintaining the platform host systems. Embodiments of the containers comprising the web crawlers may be transferred between platform host systems, data centers and/or geolocations, allowing for improved latency when the web crawler may be crawling a web resource, access to additional computing resources provided by the platform host system and for changing the IP address of the web crawler in order to avoid web resources that may be blocking the web crawler from performing crawling actions on the web resources. As containers comprising web crawlers transfer between platform host systems, data centers and/or geolocations, the platform host system receiving the containerized web crawlers may assign a new IP address to the web crawler and further map the new IP address to the URL namespace registered to the web crawler, allowing for the registered URL of the web crawler to be tracked and identified even when the container comprising the web crawler transfers between platform hosts, data centers and geolocations.

Web Crawler Platform System and Computing Environment

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Figure 6:
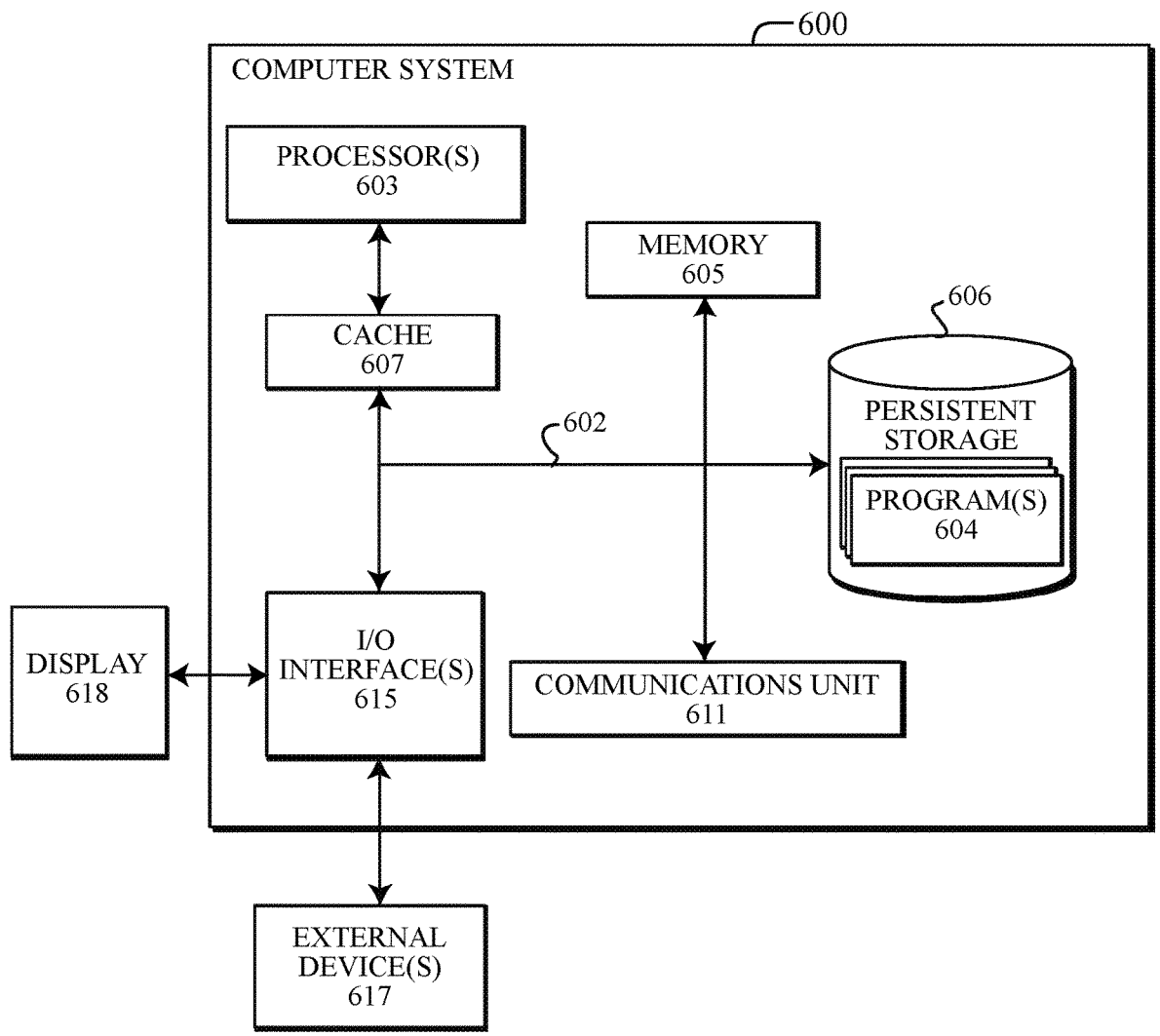
FIG. 6 depicts an embodiment of a block diagram of internal and external components of a computer system in accordance with the embodiments of the present disclosure.

Referring to the drawings, FIGS. 1-4 depict diagrams of a computing environment 100, 300 for the operation of a web crawler platform comprising one or more containerized web crawlers 200 in accordance with the embodiments shown and described within the present disclosure. Embodiments of computing environment 100, 300 may include one or more computer systems, servers, clients and/or devices interconnected via a network 150, including but not limited to the interconnection of one or more platform host systems 101, a plurality of resource servers 116a . . . 116z (referred to generally as "resource server 116"), and/or client systems 117. Embodiments of the platform host system 101, resource server 116, client systems 117 and other network devices and systems connected to network 150, not only may comprise the elements of the systems and devices depicted in FIGS. 1-4, but also may incorporate one or more elements of a computer system 600, as shown in FIG. 6 and described in the COMPUTER SYSTEM section below. One or more elements of the computer system 600 may be integrated into the platform host systems 101, resource servers 116 and client systems 117 of the computing environment 100, 300 including (but not limited to) the integration of one or more processor(s) 603, program(s) 604, memory 605, persistent storage 606, cache 607, communications unit 611, input/output (I/O) interface(s) 615, external device(s) 617 and human-readable display 618.

Embodiments of the platform host system 101, resource servers 116, client systems 117 and other network-connected systems or devices may operate as desktop computers, laptop computers, tablet computers, smartphones, server computers, network nodes, wearable accessories such as smartwatches, smart glasses, internet-of-things (IoT) devices or any other computer system known in the art. In some embodiments of the computing environments 100, 300 one or more platform host systems, 101 and/or client systems 117 may represent computer systems utilizing clustered computers and components acting as a single pool of seamless resources when accessed through network 150. For example, such embodiments can be used in a data center, cloud computing, storage area network (SAN), and network-attached storage (NAS) applications.

Embodiments of the platform host system 101, resource servers 116, client systems 117 and other network-connected devices may be placed into communication with one another over the network 150. Embodiments of the network 150 may be constructed using wired, wireless or fiber-optic connections. Embodiments of the platform host system 101, resource servers 116 and client systems 117 may connect and communicate over the network 150 via a communications unit 611, such as a network interface controller, network interface card or other network communication device capable of facilitating a connection to the network 150. Embodiments of the communications unit 611 may implement specialized electronic circuitry allowing for communication using a specific physical layer and a data link layer standard. For example, Ethernet, Fiber channel, Wi-Fi or Token Ring to transmit data between the platform host system 101, resource servers 116 and/or the client systems 117 connected to network 150. Communications unit 611 may further allow for a full network protocol stack, enabling communication over network 150 to the group of platform host systems 101, resource servers 116, client systems 117 or other network devices linked together through communication channels of network 150. Network 150 may facilitate communication and resource sharing among the platform host system 101, resource servers 116, client systems 117 and other network-accessible systems or devices connected to the network 150 (for example, network-accessible storage media). Examples of network 150 may include a local area network (LAN), home area network (HAN), wide area network (WAN), backbone networks (BBN), peer-to-peer networks (P2P), campus networks, enterprise networks, the Internet, cloud computing networks and any other network known by a person of ordinary skill in the art.

Cloud computing networks are a model of service delivery for enabling convenient, on-demand network 150 access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network 150 and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment 300 is service-oriented with a focus on statelessness, low coupling, modularity, and semantic interoperability. At the heart of cloud computing is an infrastructure that includes a network 150 of interconnected nodes 310.

Figure 3:
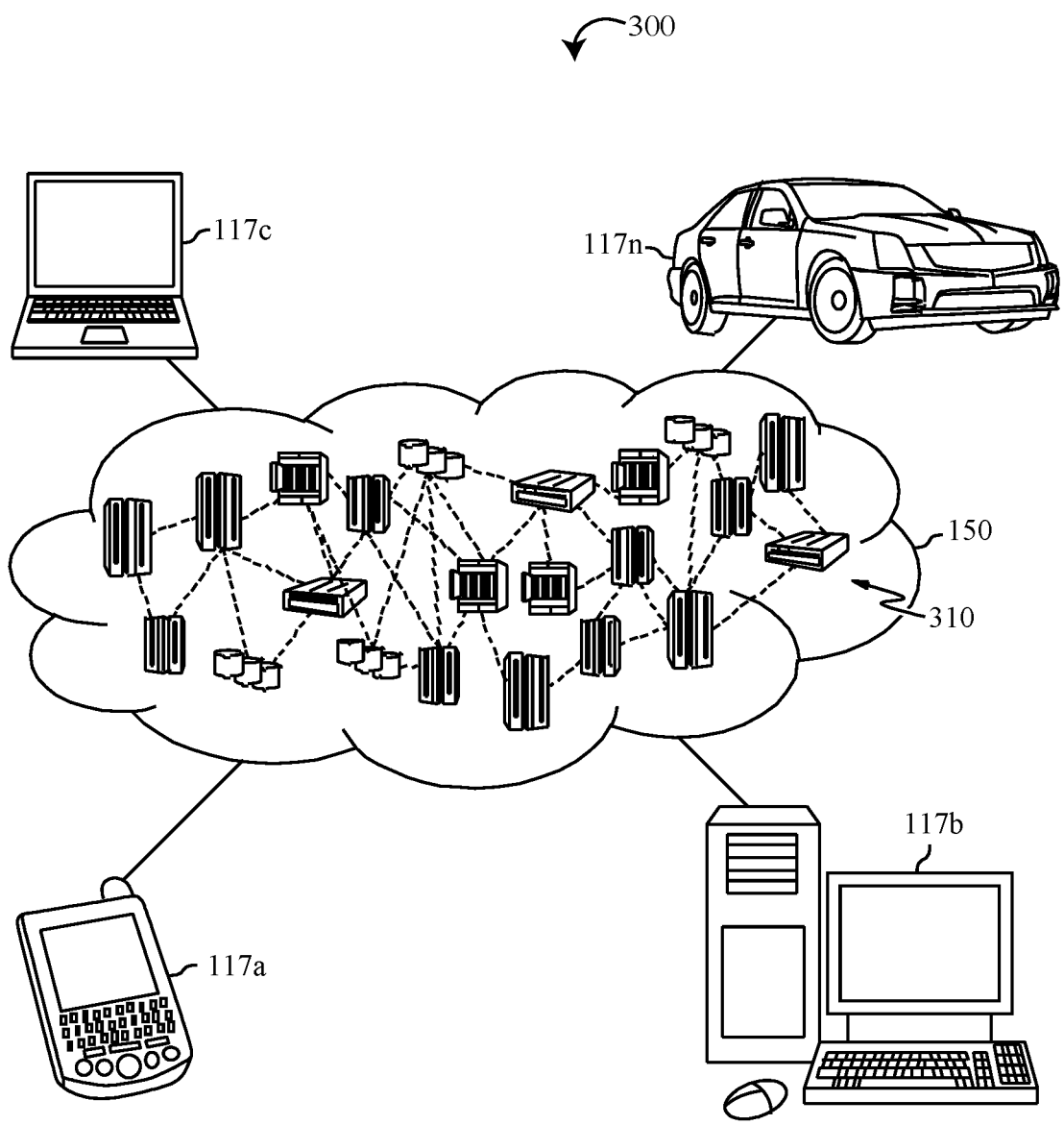
FIG. 3 depicts an embodiment of a cloud computing environment in accordance with the present disclosure.

Referring to the drawings, FIG. 3 is an illustrative example of a cloud computing environment 300. As shown, cloud computing environment 300 includes one or more cloud computing nodes 310 with which client systems 117 operated by the cloud consumers, for example, a personal digital assistant (PDA) or cellular telephone 117a, desktop computer 117b, laptop computer 117c and/or non-conventional computer systems such as an automobile 117n, wristwatch, glasses, etc. Nodes 310 of the cloud computing environment 300 may communicate with one another and may be grouped (not shown) physically or virtually, in one or more networks 150, such as Private, Community, Public, or Hybrid clouds as described hereinabove, or a combination thereof. This may allow the cloud computing environment 300 to offer infrastructure, platforms and/or software as services for which a cloud consumer does not need to maintain resources on a client system 117 and/or platform host system 101. It is understood that the types of client systems 117 connected to the cloud computing environment 300, are intended to be illustrative only and that computing nodes 310 and cloud computing environment 300 can communicate with any type of computerized device over any type of network 150 and/or network addressable connection (e.g., using a web browser).

Figure 4:
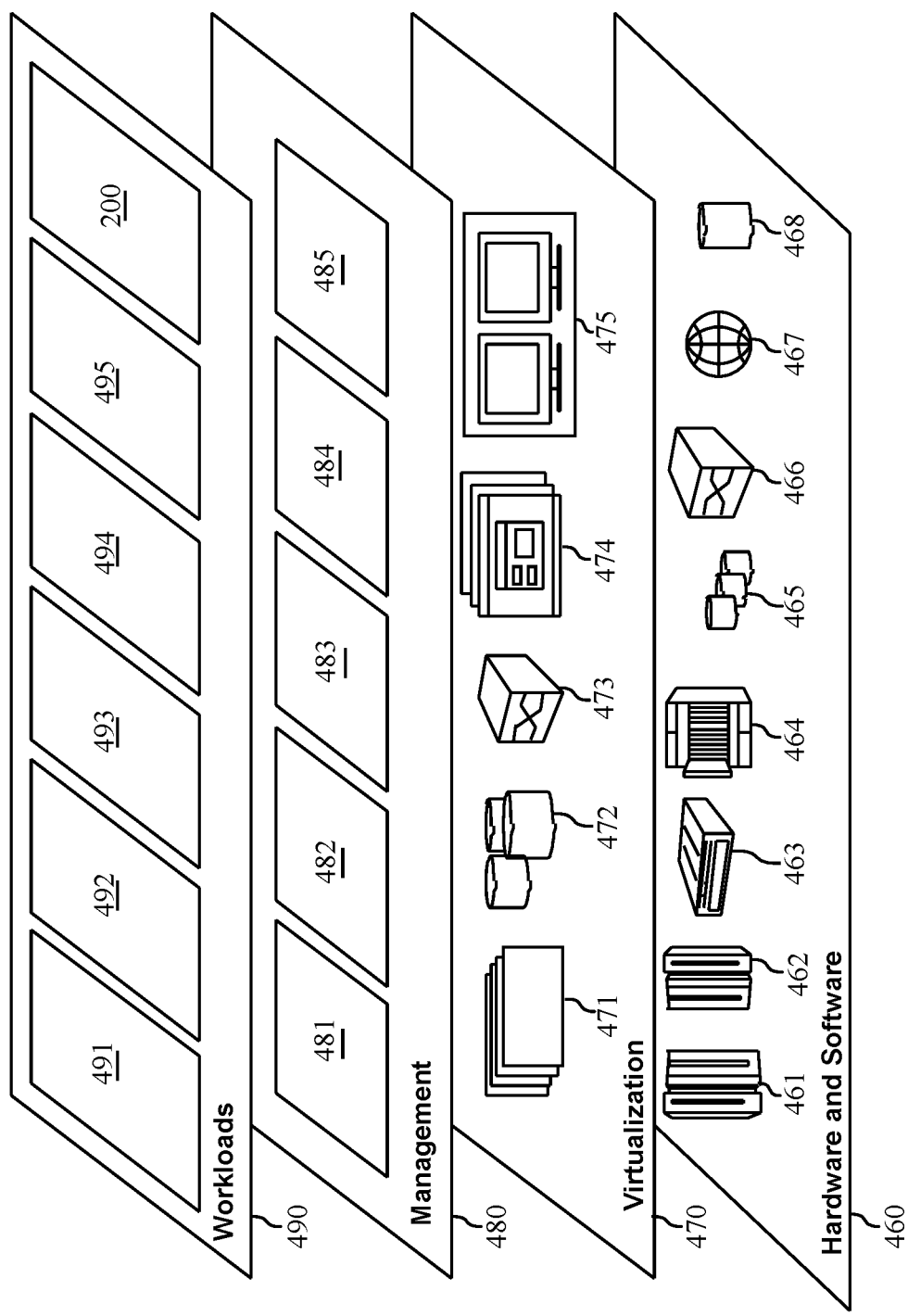
FIG. 4 depicts an embodiment of abstraction model layers of a cloud computing environment in accordance with the present disclosure.

Referring now to FIG. 4, a set of functional abstraction layers provided by cloud computing environment 300 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 include hardware and software components. Examples of hardware components include mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include mapping and navigation 491, software development and lifecycle management 492, virtual classroom education delivery 493, data analytics processing 494, transaction processing 495, and one or more containerized web crawlers 200.

Embodiments of the computing environments 100, 300 described herein may include a platform host system 101. Embodiments of the platform host system 101 may be a specialized computer system or device comprising specialized configurations of hardware, software or a combination thereof, as shown and described in FIGS. 1-4 of the present disclosure and in the embodiments described herein. Embodiments of the platform host system 101 may be a computer system 600 connected to network 150 and may provide the web crawler services of the web crawler platform to the client systems 117 of the network 150. The platform host system 101 may run a multi-user operating system (i.e. the host operating system 111) and provide computing resources via the host system hardware 113 to one or more containers 103a-103c (referred to generally as containers 103) comprising a containerized computer environment for the web crawler software 105a-105c (referred to generally as web crawler software 105) to execute and perform crawling functions of the web crawler platform.

Embodiments of computing environments 100, 300 of the web crawler platform may be organized into a plurality of data centers that may span multiple networks, domains, and/or geolocations. The data centers may reside at physical locations in some embodiments, while in other embodiments, the data centers may comprise a plurality of host platform systems 101 distributed across a cloud network and/or a combination of physically localized and distributed platform host systems 101. Data centers of the web crawler platform may include one or more platform host systems 101, providing host system hardware 113, a host operating system 111 and/or containerization software 109 such as, but not limited to, the open-source Docker and/or OpenShift software to execute and run containerized web crawlers 200 encapsulated within the environment of the containers 103 hosted by the platform host system 101 as shown in FIG. 1. Although the exemplary embodiment depicted in FIG. 1 includes three containers 103a-103c, the embodiment of FIG. 1 is merely illustrative of the concept that a plurality of containers 103 can be hosted by a platform host system 101 within the data centers of the web crawler platform. The embodiment of FIG. 1 should in no way be considered to imply that the platform host systems 101 are limited to hosting only three containers 103. The number of containers 103 hosted by a platform host system 101 may vary depending on the number of computing resources available based on the host system hardware 113 and the amount of computing resources required by individual web crawler software 105 programs being executed within the containers 103 by the containerization software 109.

Embodiments of the containerization software 109 may operate as a software platform for developing, delivering, and running containerized programs and applications as well as allowing for the deployment of code quickly within the computing environment of the containers 103. Embodiments of Containers 103 can be transferred between platform host systems 101 as well as between different data centers that may be operating in different geolocations, allowing for the containers to run on any platform host system 101 running containerization software 109. The containerization software 109 enables the platform host system 101 to separate the containerized applications and programs, such as the containerized web crawler 200, from the host system hardware 113 and other infrastructure of the platform host system 101. For example, host system hardware 113 may include one or more processor(s) 603, memory 605, persistent storage 606, cache 607, communications unit 611, communication fabric 602, I/O interface(s) 615, human-readable displays 618 and/or external device(s) 617. The containerization software 109 provides platform host systems 101 with the ability to package and run web crawler software 105 within the isolated environment of the container 103. Isolation and security provided by individual containers 103 may allow the platform host system 101 to run multiple containerized web crawlers 200 simultaneously on a single platform host system 101. A container 103 may be lightweight due to the elimination of any need for a hypervisor, typically used by virtual machines. Rather, the containers can run directly within the kernel of the host operating system 111. However, embodiments of the web crawler platform may benefit from combining virtualization of virtual machines with containerization. For example, the platform host system 101 may be a virtual machine running containerization software 109.

Embodiments of the containerization software 109 may comprise a containerization engine (not shown). The containerization engine may be a client-server application which may comprise a server program running a daemon process, a REST API specifying one or more interfaces that the web crawler software 105 and/or other programs may use to talk to the daemon process and provide instructions to the web crawler software 105 as well as a command-line interface (CLI) client for inputting instructions. In one embodiment, the client system 117 may input commands using a CLI to communicate with the containerization software 109 of the platform host system 101. In the exemplary embodiment depicted in FIG. 1, commands provided by the client system 117 to the platform host system 101 may be input via the platform user interface (UI) 121 loaded into the memory 605 or persistent storage 606 of the client system 117 interfacing with the platform host system 101.

Embodiments of the CLI may use the REST API of the containerization engine to control or interact with the daemon through automated scripting or via direct CLI commands. In response to the instructions received from the CLI, via the REST API, the daemon may create and manage the objects of the containerization software 109, including one or more software images residing within the containers 103, the containers 103 themselves, networks, data volumes, plugins, etc. An image may be a read-only template with instructions for creating a container 103 and may be customizable. Containers 103 may be a runnable instance of the software image. Containers 103 can be created, started, stopped, moved or deleted using a containerization software 109 API or via the CLI. Containers 103 can be connected to one or more networks 150, can be attached to a storage device and/or create a new image based on the current state of a container 103.

Embodiments of the platform host system 101 illustrated in the block diagram of FIG. 1 depict a plurality of containers 103a-103c, wherein a container 103 may comprise an image of a web crawler software 105 and software dependencies 107a-107c (generally referred to herein as software dependencies 107) for running instances of the web crawler software 105 within the environment of the container 103. The images of the web crawler software 105 depicted within the containers 103 may be duplicate versions of the same web crawler software 105 image. In some embodiments, the images of the web crawler software 105 may be customized variations of one another, based on a common image used as the basis for the customized variations of the web crawler software 105, while in some embodiments, one or more of the web crawler software 105 may be independently created and developed using entirely different images for creating the web crawlers. In some embodiments, a user of a client system 117 can create or develop new containers 103 comprising newly created or customized web crawlers that may be utilized by the web crawler platform. For example, a user of a client system 117 may create an uploadable web crawler container 119 that includes a container 103 comprising a web crawler software 105 image and associated software dependencies 107. The client system 117 may upload the uploadable web crawler container 119 via network 150 using the platform UI 121 and store the uploadable web crawler container 119 on the platform host system 101 whereby the containerization software 109 may run the uploadable web crawler container 119 to perform web crawling operations in the same manner in which other containers 103 previously existing on the platform host system 101 may be executed and run by the containerization software 109.

Figure 2:
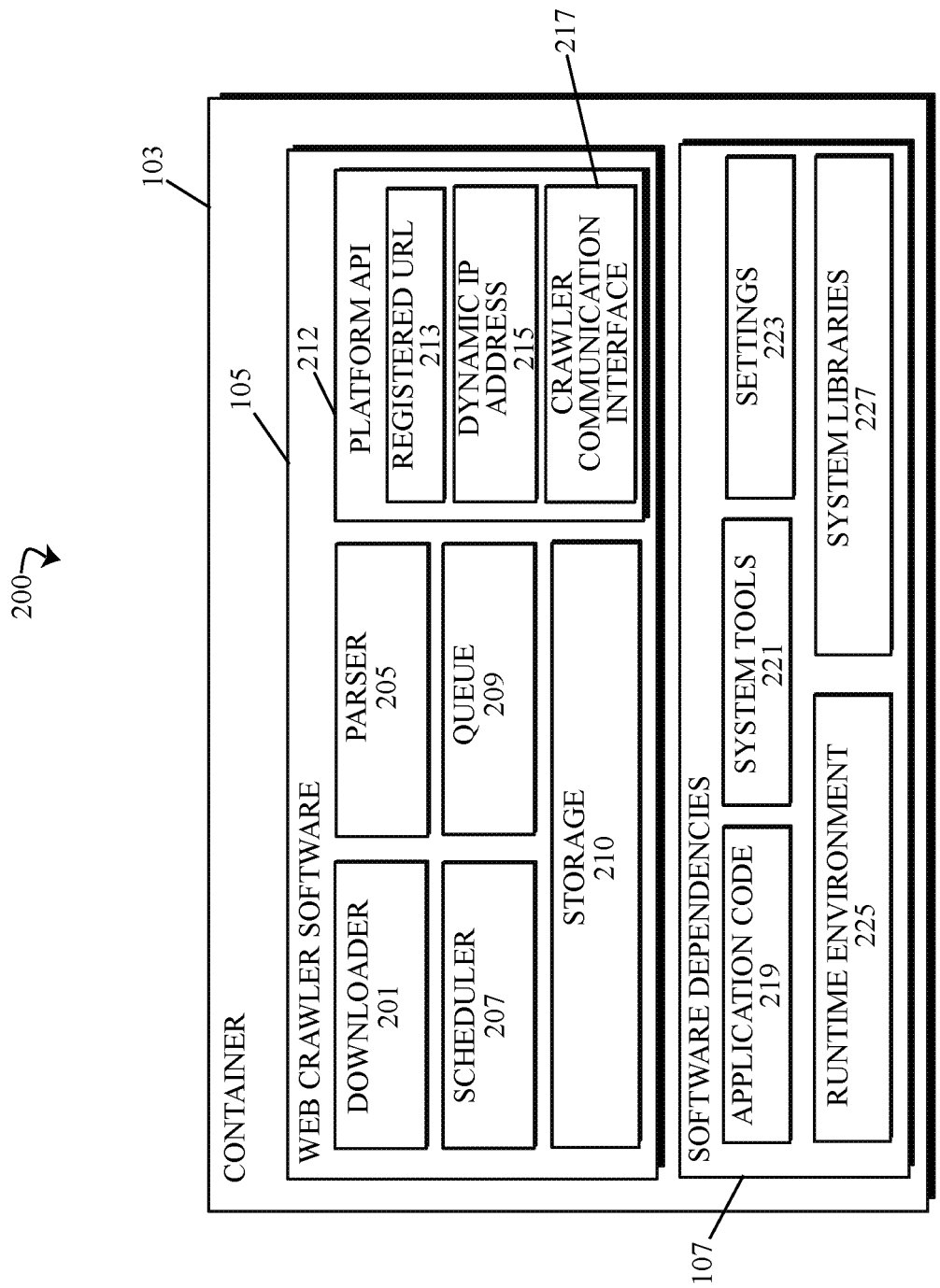
FIG. 2 depicts an embodiment of the architecture of a containerized web crawler in accordance with the present disclosure.

Referring to the drawings, FIG. 2 illustrates a block diagram of a more detailed depiction of a containerized web crawler 200, including one or more components or modules of the web crawler software 105 image and/or software dependencies 107 contained within the container 103. The term "module" may refer to a hardware module, software module, or a module may be a combination of hardware and software resources. Embodiments of hardware-based modules may include self-contained components such as chipsets, specialized circuitry, one or more memory 605 devices and/or persistent storage 606, and virtualization of host system hardware 113 utilized by the containerized web crawler 200. A software-based module may be part of a program 604, program code or linked to program code containing specifically programmed instructions loaded into a memory 605 device or persistent storage 606 device of the platform host system 101 operating as part of the computing environment 100, 300, as exemplified in the drawings of the embodiments described herein. In the exemplary embodiment of FIG. 2, the containerized web crawler 200 may include a web crawler software 105 comprising a downloader 201, parser 205, scheduler 207, queue 209, storage 210 and a platform API 212 which may further include a registered URL 213, a dynamic IP address 215 and a crawler communication interface 217. The containerized web crawler 200 may further comprise one or more software dependencies 107 that may be required to run web crawler software 105 image, including, but not limited to application code 219, system tools 221, settings 223, runtime environment 225 and system libraries 227.

Embodiments of the downloader 201 of the web crawler software 105 may perform the function or task of web crawling operations associated with downloading web pages and content from web resources 115a-115z (referred to generally as web resources 115) visited by the containerized web crawler 200 to create an index of the web resources 115 using the data and/or metadata downloaded from web resources 115. Embodiments of downloader 201 may be a multi-threaded or hyperthreaded downloader in some embodiments and may allow for multiple web pages of a web resource 115 and/or multiple web resources 115 available to the containerized web crawler 200 via a resource server 116a-116z to be downloaded by the downloader 201 simultaneously or in parallel to one another. Embodiments of the index created by the downloader 201 may be parsed and analyzed by the parser 205 to convert the raw text of the HTML web pages, hyperlinks and other content of the web resources 115 into structured data that details and summarizes the web resources 115. Parsing by the parser 205 may be performed using matching algorithms to extract relevant data and metadata from the downloaded web resources 115. For example, using a natural language processor or other know algorithms. The processed data and metadata can be stored in the storage 210 module of the web crawler software 105, which may be linked to one or more storage devices of the host system hardware 113. Embodiments of the parser 205 may be customized to improve or alter performance, by setting one or more policies that control the extraction of information obtained from the web resources 115. For example, policy settings for parsing the web resources 115 that instruct the parser 205 to ignore links to images or videos.

Embodiments of queue 209 provide a list of unvisited URLs that can be followed by the containerized web crawler 200 to the web resources 115 and/or resource server 116 maintaining the web resources 115. The URL's entered into the queue may be provided as URL seeds. For example, URLs of web resources 115 that are requested to be crawled by a user of the web crawler platform. The URL seeds may be entered into the queue 209 by the user, in some embodiments, by issuing a command to the platform host system 101 via the platform UI 121. Embodiments of the URLs populating the queue 209 may also be added by the parser 205. As the parser 205 extracts the data and/or metadata from the downloaded web resources 115, the parser 205 may extract one or more sets of hyperlinks present on the downloaded web resources 115. Hyperlinks that have already been visited by the containerized web crawler 200 may be discarded, while unvisited URLs corresponding to hyperlinks can be added to the queue 209 and subsequently visited by the containerized web crawler 200 and/or cross-referenced with the web crawler platform for other containerized web crawlers 200 that may have already visited and performed crawling operations on the web resource 115 associated with the URL within the queue 209. Containerized web crawlers 200 may directly share obtained parsed data and/or metadata with one another, eliminating the need for containerized web crawlers 200 to re-visit URLs of web resources 115 that have been previously visited, thus allowing the queue 209 to remove the URL once the shared data and/or metadata is received from another containerized web crawler 200.

Embodiments of the web crawler software 105 may further comprise a scheduler 207. The scheduler 207 may perform the functions or tasks of the web crawler that may be associated with scheduling visits to the URLs collected within the queue 209 and performing the crawling operations associated with downloading and parsing the data and/or metadata of the web resource 115 being visited. In some embodiments, the scheduler 207 may further perform functions associated with cross-referencing URLs loaded into the queue 209 with one or more containerized web crawlers 200 of the web crawler platform in order to identify whether one or more containerized web crawlers 200 may have recently visited the URL of the web resource 115. The web crawler platform may identify existing containerized web crawlers 200 using a URL namespace registration system to track the crawling operations of containerized web crawlers 200 registered to the web crawler platform.

Namespace technology provides isolated workspaces for a container 103. When a container 103 is run by the containerization software 109, the containerization software 109 may create a set of namespaces for that container 103. Aspects of the container 103 may run within a separate namespace and the access of the container 103 may be limited to that particular namespace. In the exemplary embodiment, the containers 103 registered to a web crawler platform may be registered to a URL namespace (referred to herein as a registered URL 213), which may associate the containerized web crawler 200 with a particular web resource 115 that the containerized web crawler 200 may be instructed to perform crawling operations on, creating a URL endpoint that allows other crawlers to use in order to discover the existence of crawlers assigned to the same web resources 115. Embodiments of the URL namespace may provide an identification between web crawlers, indicating which resources containerized web crawlers 200 may be responsible for visiting. A platform API 212 may provide communication between the containerized web crawler 200 and the platform host systems 101 of the web crawler platform. The platform API 212 may communicate the registered URL 213 of the container 103 to one or more platform host systems 101 of the web crawler platform, allowing other containerized web crawlers 200 to query the web crawler platform for containers 103 having the same registered URLs 213 within the URL namespace as well as allowing the web crawler platform to automatically redirect communications and requests received from a first container 103a to a second container 103b via the platform API placed in communication with one or more platform host systems 101.

A generic example of a namespace URL may be http://crawler.platform/<resource_url>#<label>, wherein containerized web crawlers 200 associated with the web resource 115 may include a <resource_url> and/or a <label> assigned to the containerized web crawler 200 that may denote a section or subsection of the web resource 115 the containerized web crawler may be responsible for performing crawling operations. For example, a first container 103a is assigned a registered URL 213 within the URL namespace that is defined as http://crawler.platform/IBM.com#applicationservices, a second container 103b is assigned the registered URL 213 within the URL namespace of http://crawler.platform/IBM.com#networkservices, while a third container 103c is also registered with http://crawler.platform/IBM.com#applicationservices. Based on the registered URLs 213 within the URL namespace, other web crawlers may identify containers 103a-103c as being assigned to crawl the IBM.com web resource 115. The labels used in this example #applicationservices and #networkservices, identify additional areas or subsections of the IBM.com web resource 115 that containerized web crawlers 200 may be assigned to visit, perform crawling operations and index. Based on the matches between the registered URL 213 within the URL namespace for the first container 103a and the third container 103c, there is an indication that either the first container 103a or the third container 103c may have previously performed crawling operations on the same web pages of the web resource 115 and may, therefore, be able to share or transfer indexed data and/or metadata collected from the first container 103a and third container 103c of the web crawler platform.

Embodiments of the platform API 212 of the containerized web crawler 200 may further include dynamic IP address 215 that may be assigned by the platform host system 101 to which the container 103 is registered. Assigned IP addresses may be considered dynamic because the IP address may change as the container 103 of the containerized web crawler 200 transfers or migrates between different platform host systems 101, data centers and/or geolocations. The API platform 212 may communicate the changes in the dynamic IP address 215 and maintain the association between the registered URL 213 and the dynamic IP address 215. As the dynamic IP address 215 changes as a function of the change in container 103 location between various platform host systems 101, data centers and/or geolocations, the platform API 212 may communicate the changes to the web crawler platform. Implementation of the IP address changes can be mapped to the registered URL 213, creating a record that may allow for other web crawlers and platform host systems 101 of the web crawler platform to continue to consistently identify the containerized web crawler 200 as the same web crawler registered to the registered URL 213 despite being assigned a new dynamic IP address 215.

Embodiments of the containerized web crawler 200 may take advantage of using the dynamic IP address to circumvent and avoid being blocked by web resources 115 or resource servers 116 that may attempt to block the containerized web crawler 200 using an IP-based blocking system. A containerized web crawler 200 that identifies a web resource 115 or resource server 116 blocking the containerized web crawler 200 from visiting a web resource 115 and performing crawling operations may attempt to circumvent the block of the current dynamic IP address 215 by changing the dynamic IP address and revisiting the web resource 115 or resource server 116. For example, containerized web crawler 200 can change platform host systems 101, data centers and/or geolocations and receive a new dynamic IP address 215 that differs from the previous dynamic IP address 215 being blocked. The web crawler platform, new data center or new platform host system 101 receiving the container 103 comprising the containerized web crawler 200 may restart the container 103, assign a new dynamic IP address 215 and map the previous dynamic IP address 215 and registered URL 213 to the new dynamic IP address 215. The containerized web crawler 200, may now visit the web resource 115 and/or resource server 116 that was blocking the previous dynamic IP address 215 and continue crawling operations.

In some embodiments of the containerized web crawler 200, the containerized web crawler 200 may actively seek to change platform host systems 101, data centers and/or geolocations and as a result, may change dynamic IP address 215. Reasons for the containerized web crawler 200 to change to a different platform host system 101, data center and/or geolocation may include avoidance of duplicate web crawlers within the same URL namespace, improvements to the latency of the containerized web crawlers 200, improved access to additional computing resources for improved performance of crawling operations and/or circumvention of blockages implemented by web resources 115 or resource servers 116 (as described above). For example, while a containerized web crawler 200 is crawling a web resource 115, the web crawler 200 may detect a shorter latency that may be achieved by making the change to a data center within a different geolocation. The platform API 212 of the containerized web crawler 200 can request registration with the new data center. The container 103 of the containerized web crawler 200 may be transferred to a new platform host system 101 within the new data center. A new dynamic IP address 215 can be assigned and the dynamic IP address 215 can be mapped to the registered URL 213, allowing the identification of the containerized web crawler 200 to be transparent to the other web crawlers 200 and platform host systems 101 of the web crawler platform. In this manner, existing web crawlers 200 of the web crawler platform may be hosted in different locations and continue accessing the existing parsed data and/or metadata collected by the containerized web crawler 200 being transferred.

In some embodiments of the containerized web crawler 200, the containerized web crawler 200 may comprise a crawler communication interface 217. The crawler communication interface 217 may be part of the platform API 212 in some embodiments and allow for direct communication between two or more containerized web crawlers 200 and/or may fulfill requests for indexed data or metadata redirected by a platform host system 101 or data center of the web crawler platform. In some embodiments crawler communication interface 217 may allow for the direct transfer or exchange of indexed data or metadata between containers 103, regardless of whether the containers 103 communicating via the crawler communication interface 217 are hosted by the same platform host system 101, data center or within the same geolocation.

Method For Implementing A Web Crawler Platform

Figure 5A:
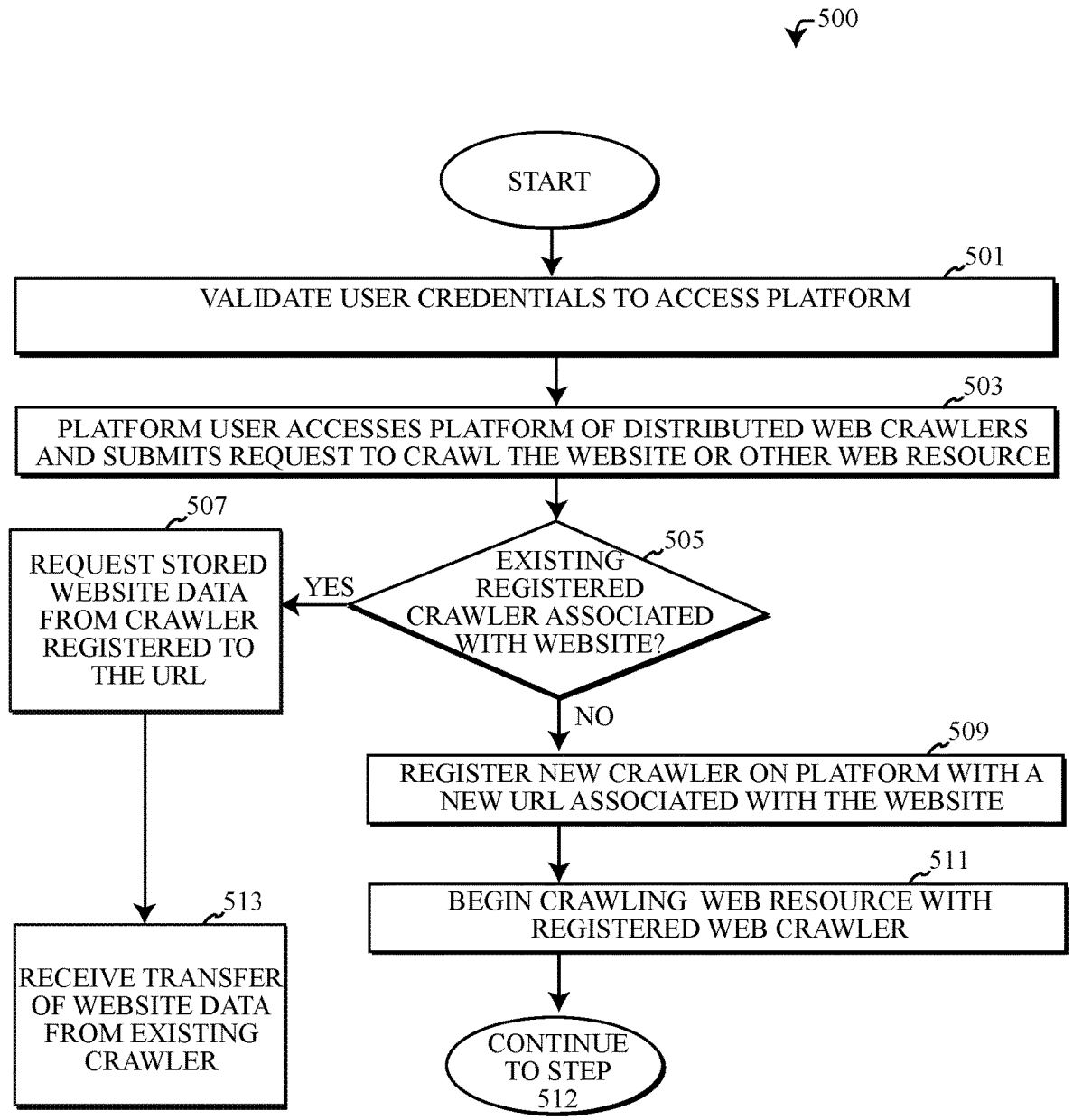
FIG. 5a depicts an embodiment of an algorithm implementing a computerized method for indexing a web resource via a web crawler platform comprising a plurality of containerized web crawlers.
Figure 5B:
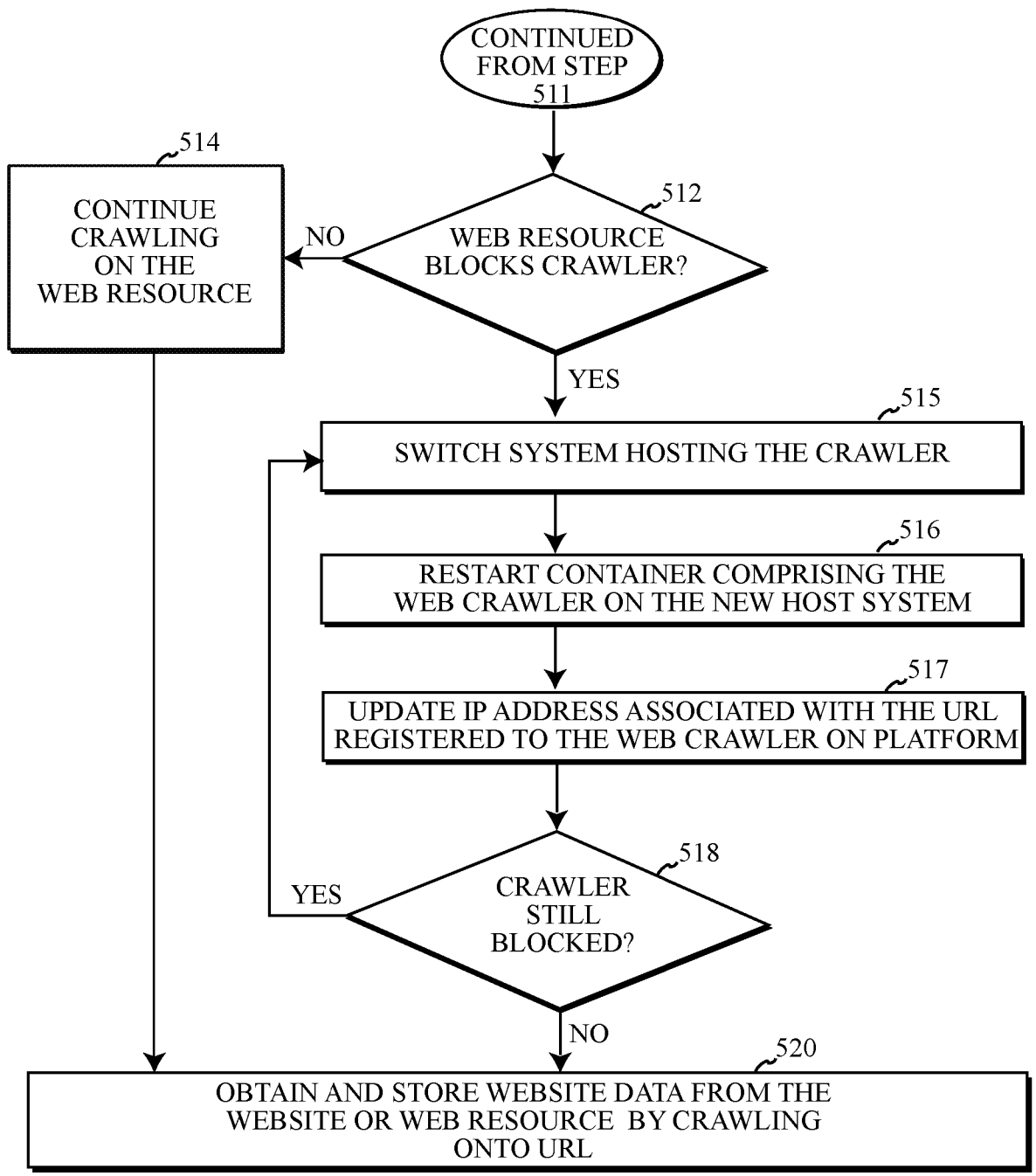
FIG. 5b depicts a continuation of steps in the algorithm of FIG. 5a implementing a computerized method for indexing web resources using a web crawler platform.

The drawings of FIGS. 5a-5b represent an embodiment of an algorithm 500 performing a computer-implemented method for implementing a web crawler platform comprising one or more containerized web crawlers 200 capable of crawling, storing, and sharing data and/or metadata collected from one or more web resources 115, as described by FIGS. 1-4 using one or more computer systems defined generically by computer system 600 of FIG. 6 below and more specifically by the embodiments of specialized computer systems depicted in FIGS. 1-4 and as described herein. A person of ordinary skill in the art should recognize that the steps of the method described in FIGS. 5a-5b may be performed in a different order than presented. The algorithm 500 may not necessarily require all the steps described herein to be performed. Rather, some embodiments of algorithm 500 may alter the methods by performing a subset of steps using one or more of the steps discussed below.

Embodiments of the algorithm 500 may begin at step 501. In step 501, a user of a web crawler platform attempt to access the web crawler platform in order to index one or more web resources 115, such as a webpage or website by using a web crawler to obtain data and/or metadata describing the web resources 115. The user of the platform may be an existing user having access credentials for connecting to the web crawler platform, or in some embodiments may be a new user accessing the web crawler platform for the first time. A user accessing the web crawler platform for the first time may register credentials with the web crawler platform or a service provider that may grant the user access to the web crawler platform and/or web crawler services. Existing users may provide access credentials and login to the web crawler platform to submit a crawling request. In step 503, the user of the web crawler platform may connect to a platform host system 101 of the web crawler platform, hosting one or more containerized web crawlers 200 via a client system 117 placed in communication with the platform host system 101 via a network 150. The user may interact with the platform host system 101 using a platform UI 121 loaded into the memory 605 or persistent storage 606 of the client system 117 to issue commands to the CLI of the containerization software 109. The user may use the platform UI 121 to make web crawler indexing requests and interface with the features or services provided by the web crawler platform.

In some embodiments, the user of the client system 117 may submit a request via the platform UI 121 for the web crawler platform to dispatch a web crawler hosted by a platform host system 101 to crawl a particular web resource 115, such as a webpage or website, which may be hosted by a resource server 116. In some embodiments, the user submitting the request through the client system 117 may further designate a particular containerized web crawler 200 to be used for the purposes of crawling the web resource 115 requested. For example, a user selects to use one of the containers 103 comprising a specific containerized web crawler 200 hosted by the platform host system 101 or registers a new container 103 comprising a containerized web crawler 200 to the web crawler platform, by uploading an uploadable web crawler container 119 stored by the client system 117 to the platform host system 101.

In step 505 of algorithm 500, the web crawler platform may make a determination whether a containerized web crawler 200 has been previously registered with the web crawler platform and that said previously registered web crawler is associated with the web resource 115 requested to be crawled by the platform user. The web crawler platform may query a database of registered containers 103 listed with the web crawler platform and match the web resource 115 of the request to the URL namespace of the registered containers 103. If a determination is made in step 505 that an existing container 103, comprising a registered URL 213 with a URL namespace associated with the web resource 115, has been previously registered to the web crawler platform and the previously containerized web crawler 200 has obtained data and/or metadata describing the web resource 115, then the algorithm 500 may proceed to step 507. In step 507, the web crawler platform may automatically redirect the request to obtain data and/or metadata from the web resource 115 to the containerized web crawler 200 comprising the registered URL 213 within the URL namespace that is associated with the web resource 115.

Embodiments of the algorithm 500, may proceed from step 507 to step 513. In some embodiments of step 513, the container 103 registered with the registered URL 213 associated with the web resource requested to be crawled, may copy or transfer a copy of the data and/or metadata stored by the previously registered containerized web crawler 200 to a storage device of the platform host system 101 being accessed by the client system 117. In some embodiments, the data and/or metadata stored by the previously registered container 103 may be copied or transferred from the containerized web crawler 200 to the client system 117 directly, wherein a user may access and/or view the data and/or metadata of the web resource via the platform UI 121. In an embodiment of the algorithm 500, wherein a user has requested the use of a particular containerized web crawler 200 or has uploaded a specific containerized web crawler 200 to crawl the web resource 115, the copy or transfer of the web resource's 115 data and/or metadata may be performed between the previously registered container 103 and the newly registered or specified container 103 used by web crawler platform, as per the user's instructions.

In some embodiments, the direct transfer of copied data and/or metadata between containers 103 may be performed by opening a channel of communication via the crawler communication interface 217, wherein the newly registered and/or specified container may submit a request to receive the data and/or metadata of the web resource 115 from the previously registered container 103. The previously registered container comprising the registered URL 213 associated with the web resource 115 that is the subject of the request in step 503, may transfer a copy of the previously collected data and/or metadata from the previously registered container 103 to the newly registered or designated container 103 and/or platform host system 101 designated by the user.

Referring back to step 505, if the determination is made by the web crawler platform that one or more of the containerized web crawlers 200 currently registered to the web crawler platform do not comprise a registered URL 213 associated with the URL of the web resource 115 requested by the user, the algorithm 500 may proceed to step 509. In step 509, a platform host system 101 of the web crawler platform may register a new containerized web crawler 200 and/or register a newly uploaded containerized web crawler 200 provided by the client system 117, with a registered URL 213 associated with the URL of the web resource 115 that is the subject of the request made in step 503. Moreover, embodiments of the platform host system 101 registering the containerized web crawler 200 may further assign a dynamic IP address 215 to the newly registered containerized web crawler 200 and map the dynamic IP address 215 to the registered URL 213. Embodiments of the dynamic IP address 215 may signify the origin and location of the containerized web crawler 200 on the current platform host system 101, data center and/or geolocation wherein the container 103 of the containerized web crawler 200 is currently stored or maintained.

In step 511 of algorithm 500, the containerized web crawler 200 that was assigned a registered URL 213 within the URL namespace associated with the web resource 115, may begin crawling the network 150 and the web resource 115 to obtain data and/or metadata of the web resource 115 requested by the platform user. In some instances, one or more web resources 115 may attempt to block or prevent the web crawler software 105 of the containerized web crawler 200 from performing crawling actions when the web crawler software 105 visits the web resource 115. For example, by blocking the dynamic IP address 215 assigned to the containerized web crawler 200 by the platform host system 101. In step 512 of algorithm 500, a determination may be made whether or not the containerized web crawler 200 registered in step 509 has been blocked by one or more web resources 115 while performing crawling actions across the network 150. If the containerized web crawler 200 has not been blocked from performing crawling actions, the algorithm 500 may proceed to step 514, wherein the containerized web crawler 200 continues to crawl the web resources 115 assigned to be crawled by the containerized web crawler 200. If, however, in step 512 the containerized web crawler 200 is being blocked from performing crawling actions on the network 150, the algorithm may proceed to step 515 and may seek to circumvent the blockage of the containerized web crawler 200.

In step 515, the web crawler platform may switch the platform host system 101 or data center currently hosting the containerized web crawler 200, assigned to fulfill the crawling action of the platform user's request, in an effort to circumvent the blocking action performed by one or more web resources 115. As part of the change in the platform host system 101 or data center hosting the containerized web crawler 200, the container 103 comprising the web crawler software 105 and the software dependencies 107 of the web crawler software 105 may be transferred from the platform host system 101 to a new platform host system 101 which may be part of a separate data center and/or different geolocation than the platform host system 101 previously hosting the container 103 of the containerized web crawler 200.

In step 516, the container 103 that was migrated from the platform host system 101 to the new platform host system 101 may be restarted by the new platform host system 101 which is now hosting the container 103. In step 517, the new platform host system 101 that is now hosting the containerized web crawler 200, may update the dynamic IP address 215 of the containerized web crawler 200 and map the new dynamic IP address 215 assigned by the new platform host system 101 to the registered URL of the containerized web crawler 200, ensuring that the new platform host systems 101 and the other containerized web crawlers 200 of the web crawler platform can continue to consistently identify, connect with and search for the containerized web crawler 200 having the registered URL 213 within a particular URL namespace, despite the change in the dynamic IP address 215.

In step 518 of algorithm 500, the web crawler software 105 of the containerized web crawler 200 may attempt to perform crawling actions on one or more web resources 115 previously determined to have blocked the containerized web crawler 200 in step 512. The algorithm 500 in step 518 may determine whether or not the containerized web crawler 200 continues to remain blocked despite switching platform host systems 101 or data center and assigning a new dynamic IP address 215 to the containerized web crawler 200. If in step 518, the containerized web crawler 200 continues to remain blocked by the web resource 115 attempting to be crawled by the web crawler software 105 of the containerized web crawler 200, the algorithm 500 may return to step 515 and attempt to switch platform host systems 101 again. Conversely, if in step 518, the containerized web crawler 200 is determined to no longer be blocked by the one or more web resources 115, the algorithm 500 may proceed to step 520, wherein the containerized web crawler 200 may download, parse and store the data and/or metadata from the web resource 115 by crawling onto the URL of the web resources 115, storing the collected data and/or metadata as an index to storage 210. In some embodiments of the algorithm 500, the containerized web crawler 200 may fulfill the request of the platform user by transmitting the downloaded and parsed data and/or metadata to the client system 117 via the platform API 212, allowing for the platform user to view the parsed data and/or metadata via the platform UI 121.

Computer System

FIG. 6 illustrates a block diagram of internal and external components depicting an embodiment of a computer system 600, which may be representative of the one or more computer systems depicted in the computing environment 100, 300 as shown in FIGS. 1-4, in accordance with the embodiments of the present disclosure. It should be appreciated that FIG. 6 provides only an illustration of one implementation and does not imply any limitations with regard to the environments in which different embodiments may be implemented. In general, the components illustrated in FIG. 6 are representative of any electronic device capable of executing machine-readable program instructions. Examples of computer systems, environments, and/or configurations that may be represented by the components illustrated in FIG. 6 include, but are not limited to, personal computer systems, server computer systems, client systems, network devices, network terminals, thin clients, thick clients, kiosks, laptop computer systems, tablet computer systems, cellular telephones (e.g., smartphones), multiprocessor systems, microprocessor-based systems, network PCs, minicomputer systems, mainframe computer systems, IoT devices, sensor devices and distributed cloud computing environments that include any of the above systems or devices or additional computing devices or systems known or used by a person skilled in the art.

Computer system 600 may include communications fabric 602, which provides for communications between one or more processors 603, memory 605, persistent storage 606, communications unit 611, and one or more input/output (I/O) interface(s) 615. Communications fabric 602 can be implemented with any architecture designed for passing data and/or controlling information between processors 603 (such as microprocessors, communications, and network processors, etc.), memory 605, external devices 617, and any other hardware components within a system. For example, communications fabric 602 can be implemented with one or more buses.

Memory 605 and persistent storage 606 may be computer-readable storage media. Embodiments of memory 605 may include random access memory (RAM) and cache 607 memory. In general, memory 605 can include any suitable volatile or non-volatile computer-readable storage media and may comprise firmware or other software programmed into the memory 605. Software applications, program(s) 604 and services, such as containerized software programs operating via containerization software 109 to run using a host operating system 111 and host system hardware 113, may be stored in persistent storage 606 for execution and/or access by one or more of the respective processors 603 of the computer system 600.

Persistent storage 606 may include, for example, a plurality of magnetic hard disk drives. Alternatively, or in addition to magnetic hard disk drives, persistent storage 606 can include one or more solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 606 can also be removable. For example, a removable hard drive can be used for persistent storage 606. Other examples include optical and magnetic disks, thumb drives, and smart cards that are inserted into a drive for transfer onto another computer-readable storage medium that is also part of persistent storage 606.

Communications unit 611 provides for communications with other computer systems or devices via a network 150. In the exemplary embodiment, communications unit 611 may include network adapters or interfaces such as a TCP/IP adapter cards, wireless Wi-Fi interface cards, 3G, 4G, or 5G wireless interface cards or other wired or wireless communication links. The communication network 150 can comprise, for example, copper wires, optical fibers, wireless transmission, routers, firewalls, switches, gateway computers, edge servers and/or other network hardware which may be part of or connect nodes of the network 150 to end-user devices, client devices, host systems, terminals or other network computer systems. Software and data used to practice embodiments of the present invention can be downloaded to each of the computer systems operating in computing environment 100, 300 through communications unit 611 (e.g., via the Internet, a local area network or other wide area networks). From communications unit 611, the software and data can be loaded onto persistent storage 606.

One or more I/O interfaces 615 may allow for input and output of data with other devices that may be connected to computer system 600. For example, I/O interface 615 can provide a connection to one or more external devices 617 such as one or more internet-of-things devices, recording devices such as an audio system, camera systems, one or more sensor device(s), input devices such as a keyboard, computer mouse, touch screen, virtual keyboard, touchpad, pointing device, or other human interface devices. External devices 617 can also include portable computer-readable storage media such as, for example, thumb drives, portable optical or magnetic disks, and memory cards. I/O interface 615 may connect to human-readable display 618. Human-readable display 618 provides a mechanism to display data to a user and can be, for example, a computer monitor or screen. Human-readable display 618 can also be an incorporated display and may function as a touch screen, such as a built-in display of a tablet computer.

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   registering, by one or more processors, a first containerized web crawler to a web crawler platform;
   assigning, by the one or more processors, a first uniform resource locator (URL) namespace to the first containerized web crawler;
   receiving, by the one or more processors, a request for the first containerized web crawler to index a web resource associated with the first URL namespace;
   determining, by the one or more processors, if the web crawler platform can provide a second URL namespace, assigned to a second containerized web crawler registered to the web crawler platform, matching the first URL namespace;
   responsive to the web crawler platform providing the second URL namespace, taking processing actions comprising:
      identifying, by the one or more processors, the second containerized web crawler, which has previously indexed the web resource and stored data or metadata describing the web resource; and
      fulfilling, by the one or more processors, the request based on copying the data or the metadata from a storage device associated with the second containerized web crawler to a storage device associated with the first containerized web crawler.

2. The computer-implemented method of claim 1, wherein fulfilling the request includes automatically redirecting, by the web crawler platform, the request from the first containerized web crawler to the second containerized web crawler.

3. The computer-implemented method of claim 1, wherein responsive to the web crawler platform not providing the second URL namespace, taking processing actions comprising:
  indexing, by the one or more processors, the first containerized web crawler, the web resource by visiting the web resource and copying the data or metadata to the storage device associated with the first containerized web crawler.

4. The computer-implemented method of claim 3, further comprising:
  detecting, by the one or more processors, a latency between the first containerized web crawler and a second platform host system that is less than a latency between the first containerized web crawler and a platform host system currently hosting the first containerized web crawler; and
  migrating, by the one or more processors, the first containerized web crawler from the platform host system to the second platform host system.

5. The computer-implemented method of claim 3, further comprising:
  detecting, by the one or more processors, the web resource blocking indexing of the first containerized web crawler;
  migrating, by the one or more processors, the first containerized web crawler from a first platform host system currently hosting the first containerized web crawler, to a second platform host system;
  replacing, by the one or more processors, an existing internet protocol (IP) address assigned to the first containerized web crawler by the first platform host system with a new IP address assigned by the second platform host system, upon migration of the first containerized web crawler from the platform host system to the second platform host system; and
  mapping, by the one or more processors, the new IP address to the first URL namespace; and
  indexing, by the one or more processors, the web resource by visiting URLs of the web resource using the new IP address; and
  fulfilling, by the one or more processors, the request based on storing the data or the metadata describing the web resource to the storage device associated with the first containerized web crawler.

6. The computer-implemented method of claim 1, wherein the first containerized web crawler is hosted by a platform host system and the second containerized web crawler is hosted by a second platform host system.

7. The computer-implemented method of claim 6, wherein the platform host system is managed by a first data center and the second platform host system is managed by a second data center, wherein the first data center and the second data center are in different geographic locations.

8. A computer system comprising:
  one or more processors; and
  a computer-readable storage media coupled to the one or more processors, wherein the computer-readable storage media contains program instructions executing a computer-implemented method comprising:
  registering, by the one or more processors, a first containerized web crawler to a web crawler platform;
  assigning, by the one or more processors, a first uniform resource locator (URL) namespace to the first containerized web crawler;
  receiving, by the one or more processors, a request for the first containerized web crawler to index a web resource associated with the first URL namespace;
  determining, by the one or more processors, if the web crawler platform can provide a second URL namespace, assigned to a second containerized web crawler registered to the web crawler platform, matching the first URL namespace;
  responsive to the web crawler platform providing the second URL namespace, taking processing actions comprising:
    identifying, by the one or more processors, the second containerized web crawler, which has previously indexed the web resource and stored data or metadata describing the web resource; and
    fulfilling, by the one or more processors, the request based on copying the data or the metadata from a storage device associated with the second containerized web crawler to a storage device associated with the first containerized web crawler.

9. The computer system of claim 8, further comprising:
  wherein fulfilling the request includes automatically redirecting, by the web crawler platform, the request from the first containerized web crawler to the second containerized web crawler.

10. The computer system of claim 8, wherein responsive to the web crawler platform not providing the second URL namespace, taking processing actions comprising:
  indexing, by the one or more processors, the first containerized web crawler, the web resource by visiting the web resource and copying the data or metadata to the storage device associated with the first containerized web crawler.

11. The computer system of claim 10, further comprising:
  detecting, by the one or more processors, a latency between the first containerized web crawler and a second platform host system that is less than a latency between the first containerized web crawler and a platform host system currently hosting the first containerized web crawler; and
  migrating, by the one or more processors, the first containerized web crawler from the platform host system to the second platform host system.

12. The computer system of claim 10, further comprising:
  detecting, by the one or more processors, the web resource blocking indexing of the first containerized web crawler;
  migrating, by the one or more processors, the first containerized web crawler from a first platform host system currently hosting the first containerized web crawler, to a second platform host system;
  replacing, by the one or more processors, an existing internet protocol (IP) address assigned to the first containerized web crawler by the first platform host system with a new IP address assigned by the second platform host system, upon migration of the first containerized web crawler from the platform host system to the second platform host system; and
  mapping, by the one or more processors, the new IP address to the first URL namespace; and
  indexing, by the one or more processors, the web resource by visiting URLs of the web resource using the new IP address; and fulfilling, by the one or more processors, the request based on storing the data or the metadata describing the web resource to the storage device associated with the first containerized web crawler.

13. The computer system of claim 8, wherein the first containerized web crawler is hosted by a platform host system and the second containerized web crawler is hosted by a second platform host system.

14. The computer system of claim 13, wherein the platform host system is managed by a first data center and the second platform host system is managed by a second data center, wherein the first data center and the second data center are in different geographic locations.

15. A computer program product comprising:
one or more computer-readable storage media having computer-readable program instructions stored on the one or more computer-readable storage media, said program instructions executes a computer-implemented method comprising the steps of:
registering, by one or more processors, a first containerized web crawler to a web crawler platform;
assigning, by the one or more processors, a first uniform resource locator (URL) namespace to the first containerized web crawler;
receiving, by the one or more processors, a request for the first containerized web crawler to index a web resource associated with the first URL namespace;
determining, by the one or more processors, if the web crawler platform can provide a second URL namespace, assigned to a second containerized web crawler registered to the web crawler platform, matching the first URL namespace;
responsive to the web crawler platform providing the second URL namespace, taking processing actions comprising:
identifying, by the one or more processors, the second containerized web crawler, which has previously indexed the web resource and stored data or metadata describing the web resource; and
fulfilling, by the one or more processors, the request based on copying the data or the metadata from a storage device associated with the second containerized web crawler to a storage device associated with the first containerized web crawler.

16. The computer program product of claim 15, further comprising:
wherein fulfilling the request includes automatically redirecting, by the web crawler platform, the request from the first containerized web crawler to the second containerized web crawler.

17. The computer program product of claim 15, wherein responsive to the web crawler platform not providing the second URL namespace, taking processing actions comprising:
indexing, by the one or more processors, the first containerized web crawler, the web resource by visiting the web resource and copying the data or metadata to the storage device associated with the first containerized web crawler.

18. The computer program product of claim 17, further comprising:
detecting, by the one or more processors, a latency between the first containerized web crawler and a second platform host system that is less than a latency between the first containerized web crawler and a platform host system currently hosting the first containerized web crawler; and
migrating, by the one or more processors, the first containerized web crawler from the platform host system to the second platform host system.

19. The computer program product of claim 17, further comprising:
detecting, by the one or more processors, the web resource blocking indexing of the first containerized web crawler;
migrating, by the one or more processors, the first containerized web crawler from a first platform host system currently hosting the first containerized web crawler, to a second platform host system;
replacing, by the one or more processors, an existing internet protocol (IP) address assigned to the first containerized web crawler by the first platform host system with a new IP address assigned by the second platform host system, upon migration of the first containerized web crawler from the platform host system to the second platform host system; and
mapping, by the one or more processors, the new IP address to the first URL namespace; and
indexing, by the one or more processors, the web resource by visiting URLs of the web resource using the new IP address; and
fulfilling, by the one or more processors, the request based on storing the data or the metadata describing the web resource to the storage device associated with the first containerized web crawler.

20. The computer program product of claim 15, wherein the first containerized web crawler is hosted by a platform host system managed by a first data center, the second containerized web crawler is hosted by a second platform host system managed by a second data center and the first data center and the second data center are in different geographic locations.

* * * * *